United States Patent Office 3,056,721
Patented Oct. 2, 1962

3,056,721
CUPROUS-CARBAMATE FUNGICIDE
André Allais, Pierre Girault, and Anatole Vesterman, Paris, France, assignors to Roussel-UCLAF, Paris, France
No Drawing. Filed Apr. 5, 1960, Ser. No. 20,007
12 Claims. (Cl. 167—22)

The present invention relates to a highly effective fungicidal composition and more particularly to a fungicidal composition containing, as active ingredient, a cuprous complex compound of dimethyl dithiocarbamic acid and to a method of destroying pests with such a composition.

The present application is a continuation-in-part application of our copending application Serial No. 760,574, filed September 12, 1958, now U.S. Patent 2,998,442, and entitled: "Fungicidal Copper(I) Complex Compound and Process of Producing Same."

It is one object of the present invention to provide a simple and effective method of treating mildew and other fungal infections of plants.

Another object of the present invention is to provide a highly effective fungicidal composition useful in combatting mildew and other fungal infections of plants.

Other objects of the present invention and advantageous features thereof will become apparent as the description proceeds.

The new cuprous complex compound of dimethyl dithiocarbamic acid according to the present invention corresponds approximately to the formula $C_3H_6NS_2Cu.2CuCl$ and is particularly characterized by its high copper content of between about 47% and about 50% and by its high fungicidal activity. It is used in agriculture in the treatment of mildew and other fungal infections of plants. The new compound is characterized by its mode of preparation as described hereinafter and by its high copper content.

In order to prepare the new product according to the present invention which has a higher copper content than cuprous dimethyl dithiocarbamate, an excess of cuprous chloride in an aqueous solution is reacted with an aqueous solution of sodium dimethyl dithiocarbamate in an inert gas atmosphere and in the presence of sodium bisulfite in order to avoid the conversion of the cuprous compound into the cupric compound. The reaction is carried out in the presence of sodium chloride in order to solubilize the cuprous chloride. The aqueous solution of sodium dimethyl dithiocarbamate may previously be prepared by reaction of carbon disulfide with dimethylamine in the presence of sodium hydroxide. It is, of course, well understood that the metathesis process with cuprous chloride may be carried out, without departing from the scope of the present invention, with another alkali metal salt of dimethyl dithiocarbamic acid than the sodium salt or by using an alkaline earth metal salt of said acid. The reaction is preferably carried out at room temperature. After metathesis is completed, the precipitated complex compound is filtered off with suction, washed first with an aqueous saturated solution of sodium chloride containing 5% of sodium bisulfite and then with water until the wash waters are free of chloride ions. After drying, the compound generally contains between about 47% and about 50% of copper and between about 17% and about 19% of chlorine.

As stated hereinabove, the new copper complex compound according to the present invention is used in agriculture for the treatment of mildew and other fungal plant diseases. Tests have shown that the compound does not possess any phytotoxicity and that it completely protects the leaves of grapevine artificially infected by Plasmopara. In these tests first 0.5 cc. of an 0.27% suspension of the compound according to the invention were applied to 75 sq. cm. of leaf surface and the thus treated leaves were subjected to four successive infections and to 12 days of intermittent rain, equal to one hour of continuous rain. The rainfall corresponds to a rainfall of 12 mm. No fungus infection was observed in the treated leaves while the controls showed severe infection. In the field aqueous suspensions of the new cuprous complex compound of the formula $C_3H_6NS_2Cu.2CuCl$ are used which contain between about 0.2% and about 0.3% of said compound.

The new cuprous complex compound of dimethyl dithiocarbamic acid is prepared as described hereinafter although the preparation is not limited to such a process. More particularly, other salts of dimethyl dithiocarbamic acid than those mentioned may be used for metathesis with cuprous chloride or the reaction may be carried out a few degrees below or above room temperature. The following examples serve to illustrate the present invention without, however, limiting the same thereto.

EXAMPLE 1

A mixture of 487 cc. of an 11.75% solution of sodium dimethyl dithiocarbamate and 300 cc. of a saturated sodium chloride solution is added, while stirring and passing nitrogen through the reaction vessel, to 1,267 cc. of a saturated sodium chloride solution containing 11.75% of cuprous chloride and 5% of sodium bisulfite within 10 minutes. Stirring is continued for 15 minutes without discontinuing nitrogen passage therethrough. The resulting orange-yellow precipitate is separated by centrifuging and is washed by suspending it three times, each time in one liter of a saturated sodium chloride solution containing 5% of sodium bisulfite. The compound is then washed with water until chlorine ions disappear from the wash water. Thereby 350 g. of a moist product are obtained which, after drying, yields 163.4 g. of the desired product. The yield corresponds to a quantitative yield.

Analysis.—48.2–48.1% Cu; 18.10% Cl; 4.1% N.

The compound has not yet been described in the literature.

The following examples serve to illustrate the present invention without, however, limiting the same thereto.

EXAMPLE 2

*Wettable Fungicidal Powder*

2 g. of sodium lignosulfonate, 4 g. of sodium dinaphthyl methane sulfonate, and 0.5 g. of sodium dodecyl benzene sulfonate are added to a quantity of the precipitated moist copper complex compound prepared as described hereinabove, washed, and filtered with suction, said quantity corresponding to 100 g. of the dry complex compound. The mixture is intimately and thoroughly homogenized to a paste, dried, and ground. A readily wettable powder is obtained. 2 kg. to 4 kg. of said powder are applied per hectare.

EXAMPLE 3

5 g. of sodium lignosulfonate and 3 g. of sodium dinaphthyl methane sulfonate are added to a quantity of the precipitated moist copper complex compound prepared as described hereinabove, washed, and centrifuged, said quantity corresponding to 100 g. of the dry complex compound. The resulting paste is dried and the dried product is comminuted whereby 3 g. of a urea-formaldehyde anionic condensation product is added. 1 kg. to 3 kg. of the resulting powder are applied per hectare.

EXAMPLE 4

5 g. of sodium lignosulfonate and 3 g. of sodium dinaphthyl methane sulfonate are added to a quantity of the precipitated moist copper complex compound prepared as described hereinabove, washed, and centrifuged, said quantity corresponding to 100 g. of the dry complex compound. The resulting paste is dried and the dried product is comminuted. 1 g. of sodium methyl oleyl taurine and 2 g. of an urea-formaldehyde anionic condensation product are added. 1 kg. to 3 kg. of the resulting powder are applied per hectare.

EXAMPLE 5

The powder obtained according to Example 2 is mixed with 3 g. of pulverulent hydroxy ethyl cellulose. The resulting mixture is used in the same manner as the powder of said Example 2.

Of course, other wetting, peptizing, and dispersing agents than those used in the preceding examples, and the other properties of the fungicidal preparation improving agents, such as adhesives etc. may be admixed to the copper complex compounds, such as Calcium lignosulfonate,
Calcium dinaphthyl methane sulfonate,
Poly-ethoxy ethers of fatty alcohols and ethylene oxide,
Various colloidal cellulose substitution products,
Polyvinyl alcohols,
Clays,
Natural silicates, and others.

These agents may be admixed to the wet paste or to the dried product as shown in the examples.

The amounts of such additives which are admixed to the copper complex compound are not limited to those amounts given in the examples. They may vary between 1% and 10% of the copper complex compound.

The readily wettable powders obtained according to Examples 2 to 5 are applied to plants in the following manner:

EXAMPLE 6

2 kg. of the powder of the cuprous complex compound of dimethyl dithiocarbamic acid are added to 20 l. of water while stirring. After the complex compound has been thoroughly and uniformly dispersed in the water, the dispersion is further diluted with water, while stirring, to a volume of 1000 l. of a preparation to be applied by spraying.

The amount of fungicidal powder preparation according to Examples 2 to 5 as it is used against cryptogamic diseases may vary between 1 kg. and 5 kg. per hectare.

It is also possible to use the fungicidal composition according to the preceding examples in the form of dusting preparations. For this purpose said compositions are diluted by means of a substantially inert pulverulent extending agent to such an extent that 20 kg. to 30 kg. of the dusting preparations can be applied to one hectare of cultivated land.

EXAMPLE 7

11 kg. of the powder obtained according to Example 2 are thoroughly and intimately mixed with 30 kg. of talc and 59 kg. of a hydrophobic carrier obtained by superficially coating calcium carbonate with a fatty acid. The resulting powder is applied by dusting.

It is also possible to use the fungicidal cuprous complex compound according to the present invention in the form of an emulsion.

EXAMPLE 8

100 g. of the precipitated copper complex compound prepared as described in Example 1, washed and filtered with suction, corresponding to 50 g. of the dry complex compound are converted into a paste by mixing with 1.5 g. of sodium lignosulfonate, 2.5 g. of sodium dinaphthyl methane sulfonate, and 4 g. of octyl phenol condensed with 9 moles of ethylene oxide. 92 g. of refined mineral oil are added with stirring to the resulting fluid paste. 4 kg. to 10 kg. of the resulting emulsion are applied to one hectare of cultivated land. Before use the mixture is diluted with water.

The solid materials present in the above mentioned compositions are as finely comminuted as possible. Particle sizes between about $1\mu$ and about $10\mu$ have proved to be especially effective in suspensions and emulsions.

The antifungal cuprous complex compound is present in the compositions according to the present invention in amounts between about 25% and about 95%. The final dusting powders, suspensions, or emulsions as they are applied to the plants contain preferably between about 0.1% and about 10% of the antifungal compounds.

In field spraying against cercosporiosis of beetroot, about 300 g. of the wettable fungicidal powder are dispersed in 100 l. of water, and 3 kg. of the powder are applied to one hectare. This dosage is a maximum one in the case of severe infection. In normal periods, the dosage may be reduced to 200 g./100 l. of water, or 2 kg. to one hectare.

Of course, many changes and variations in the composition of the fungicidal preparations, in the concentration of the active copper complex compound, in the amounts and types of wetting agents, peptizing agents, emulsifying agents, dispersing agents, spreading agents, adhesives, diluents, and other agents improving the properties of the preparations, in the manner in which the preparations are applied to the plants, and the like may be made by those skilled in the art in accordance with the principles set forth herein and in the claims annexed hereto.

We claim:

1. A method of combatting mildew and other fungal infections of plants, said method comprising spraying infected plants with an aqueous suspension of the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere.

2. The method according to claim 1, wherein the amount of the cuprous complex applied to the infested plants is between about 1 kg. and about 5 kg. per hectare of cultivated land.

3. A method of combatting mildew and other fungal infections of plants, said method comprising applying to infested plants by dusting a pulverulent composition containing, an antifungal agent, the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere.

4. The process according to claim 3, wherein the amount of the cuprous complex applied to the infested plants is between about 1 kg. and about 5 kg. per hectare of cultivated land.

5. A method of combatting mildew and other fungal infections of plants, said method comprising applying to infested plants by spraying an aqueous emulsion of the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere.

6. The method according to claim 5, wherein the amount of the cuprous complex applied to the infested plants is between about 1 kg. and about 5 kg. per hectare of cultivated land.

7. An antifugal dusting powder comprising about 10% of the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere, between about 0.1% and about 1.0% of wetting and adhesive agents, and between about 89.0% and 89.9% of an inert diluent and carrier material, said components being intimately mixed with each other.

8. An antifungal spraying composition comprising about 10% of the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere, between about 0.1% and about 1.0% of wetting and dispersing agents, and between about 89.0% and about 89.9% of water, said cuprous complex being intimately and uniformly dispersed in the water.

9. An emulsifiable antifugal spraying composition comprising about 25% of the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in inert gas atmosphere, between about 0.5% and about 5% of emulsifying agents and wetting and dispersing agents, about 46% of a mineral oil, and about 25% of water, said components being intimately and uniformly mixed with each other, said composition, on addition to further amounts of water, forming an antifungal emulsion.

10. An antifungal dusting powder comprising, as antifungal agent, the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere, wetting and adhesive agents, and an inert diluent and carrier material, said components being intimately mixed with each other.

11. An antifungal spraying composition comprising, as antifungal agent, the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere, wetting and dispersing agents, and water, said cuprous complex being intimately and uniformly dispersed in the water.

12. An antifungal spraying composition comprising, as antifungal agent, the cuprous complex of dimethyl dithiocarbamic acid containing between about 47% and 50% by weight of copper and having the approximate empirical formula $C_3H_6NS_2Cu.2CuCl$ produced by the reaction of a salt of dimethyl dithiocarbamic acid selected from the group consisting of an alkali metal salt and an alkaline earth metal salt with an excess of aqueous cuprous chloride in the presence of an alkali metal chloride and an alkali metal bisulfite and in an inert gas atmosphere, emulsifying agents and wetting and dispersing agents, a mineral oil, and water, said components being intimately and uniformly mixed with each other, said composition, on addition to further amounts of mater, forming an antifungal emulsion.

References Cited in the file of this patent

UNITED STATES PATENTS

| 1,972,961 | Tisdale | Sept. 11, 1934 |
| 2,492,314 | Olin | Dec. 27, 1949 |
| 2,998,442 | Allais | Aug. 29, 1961 |